June 19, 1973    B. J. SANDLIN ET AL    3,740,198

GAS GENERATOR STRUCTURE

Filed July 5, 1967

Billy J. Sandlin
William A. Duncan
James A. Murfree, Jr.
INVENTORS.

BY Harry M. Saragovitz
Edward J. Kelly
Herbert Berl
Elihu L. Turetsky

United States Patent Office 3,740,198
Patented June 19, 1973

3,740,198
GAS GENERATOR STRUCTURE
Billy J. Sandlin, Athens, and William A. Duncan and James A. Murfree, Jr., Huntsville, Ala., assignors to the United States of America as represented by the Secretary of the Army
Filed July 5, 1967, Ser. No. 651,326
Int. Cl. B01j 7/00
U.S. Cl. 23—281                                            9 Claims

ABSTRACT OF THE DISCLOSURE

The use of porous firebrick (or a similar inert porous support material) which is shaped to fit a housing and thus acts as a bed for an initiator in a gas generator employing an exothermally decomposing monopropellant.

BACKGROUND OF THE INVENTION

This invention relates to a gas generator, and particularly to one using a chemically loaded, porous firebrick cylinder as a support bed for various chemical initiators as more particularly disclosed in copending application Ser. No. 651,654, filed July 5, 1967.

The development of reliable, useful monopropellant liquid gas generators for use in missiles is a pressing problem and the subject of much research. Much work has been done on the catalytic decomposition of hydrazine and similar fuels for gas generation. These gas generators utilize an inert bed supporting a nonreactive and nonconsumed coating of an active catalytic agent which rapidly and spontaneously decomposes hydrazine into the gases nitrogen, hydrogen and ammonia. These catalytic decomposition schemes thus allow numerous restarts and make an on-off operation feasible since the catalyst is not consumed. However, the more active and better catalysts are expensive (greater than $1000/lb.). Therefore, less expensive catalysts or the development of new gas generators for monopropellants which meet the requirements for gas generation applications in missiles are very desirable.

Accordingly, it is an object of this invention to provide a new and cheaper gas generator for aiding in the decomposition of monopropellants which meets the requirements for gas generator applications in missiles.

A particular object of this invention is to provide such a loading arrangement for a gas generator that sufficient initial enthalpy is provided from the hypergolic ignition of an exothermally decomposing liquid monopropellant as the monopropellant passes through the initiator-loaded firebrick to generate sufficient heat to sustain a steady-state decomposition for gas generation.

SUMMARY OF THE INVENTION

A gas generator is provided by mechanically supporting certain chemical initiators in various arrangements in inert porous solid support materials such as firebrick.

Gas generation occurs when an exothermally decomposing liquid monopropellant such as hydrazine is brought into contact with the chemical initiator supported by the fire brick.

BRIEF DESCRIPTION OF THE DRAWING

This invention and objects and advantages thereof will become more clearly understood by reference to the following detailed description, of which the accompanying drawing forms an integral part thereof, and in which.

DESCRIPTION OF THE PREFERRED EMBODIMENTS

This invention may best be understood by considering the following detailed embodiments, which embodiments are not intended to be limitations on this invention, and are merely included for purposes of fully disclosing this invention.

Figure 1:
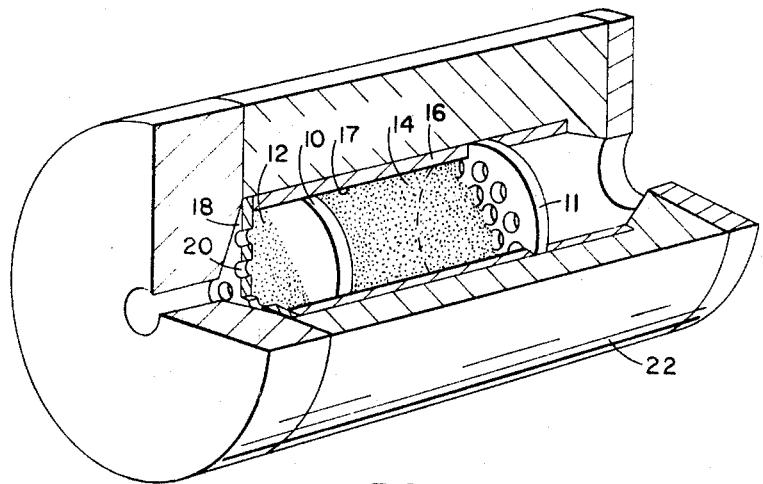
FIG. 1 is a perspective view, shown partially cut away, of a gas generating bed of this invention inside a gas generator housing.
Figure 2:
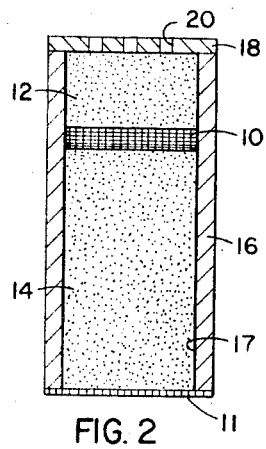
FIG. 2 is a cross-sectional view of the gas generating bed of FIG. 1.

FIGS. 1 and 2 show an arrangement employing a sandwich design, i.e., a layer of initiator 10 (preferably a compacted solid) is placed between two layers of firebrick 12 and 14. The firebrick and initiator are inclosed in sleeve 16, and a pressurized injector (not shown) and injector plate 18 are used to inject the monopropellant through holes 20 into the firebrick and intiator. The firebrick layers 12 and 14 are secured to sleeve 16 by a refractory adhesive 17. Sleeve 16, which surrounds the gas generating bed, is inclosed in a gas generator housing 22 in a conventional manner. A wire retaining screen 11 (or other perforated support) is secured to the gas generator housing 22 in a conventional manner.

Figure 3:
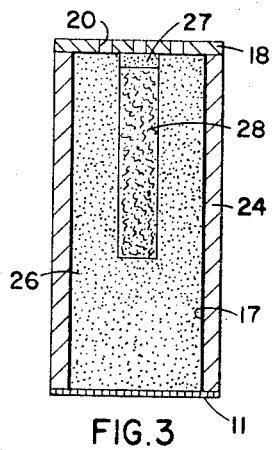
FIG. 3 is a cross-sectional view of an alternative embodiment of a gas generating bed of this invention.

The gas generating bed of FIG. 3 is another embodiment of this invention. The gas generating bed of FIG. 3 is substituted for the gas generating bed of FIG. 2 and is used in the gas generator housing of FIG. 1. A plug design is used; i.e., a plug 28 of the initiator (preferably a compacted solid) is poured or inserted into a drilled hole in the firebrick and a thin firebrick stopper 27 caps initiator plug 28. A wire retaining screen 11 (or other perforated support) is secured to the gas generator housing 22 in a conventional manner at the exit end of the housing. Sleeve 24 surrounds firebrick 26 which is secured to sleeve 24 by a refractory adhesive 17. Injector plate 18 is utilized to inject the monopropellant through holes 20 into the firebrick and initiator.

Figure 4:
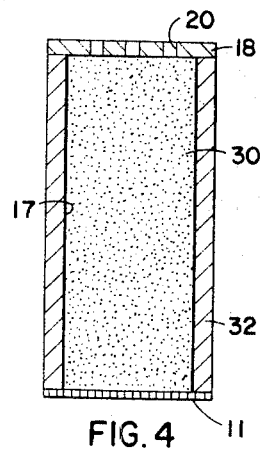
FIG. 4 is a cross-sectional view of another alternative embodiment of a gas generating bed of this invention.

The gas generating bed of FIG. 4 is another embodiment of this invention. The gas generating bed of FIG. 4 is substituted for the gas generating beds of FIGS. 2 or 3 and is used in the gas generator housing of FIG. 1. Porous firebrick support 30 with an initiator within the pores of the firebrick is secured to sleeve 32 by a refractory adhesive 17. Injector plate 18 is utilized to inject the monopropellant through holes 20 into the firebrick with the initiator supported therein, and a wire retaining screen 11 (or other perforated support) is secured to the gas generator housing 22 in a conventional manner at the exit end of the housing.

Figure 5:
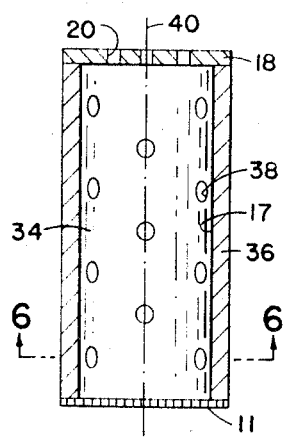
FIG. 5 is an elevation view, shown partially in section, of still another alternative embodiment of a gas generating bed of this invention.
Figure 6:
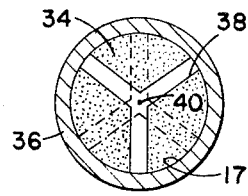
FIG. 6 is a cross-sectional view, taken along line 6—6 of FIG. 5.

Another embodiment of this invention is illustrated in FIGS. 5 and 6, the gas generating bed of which is substituted for the gas generating bed of FIG. 2 or FIG. 3 and adapted to be placed in the gas generator housing of FIG. 1. Porous firebrick support and decomposition bed 34 is secured to sleeve 36 by a refractory adhesive 17. Injector plate 18 is utilized to inject the monopropellant through holes 20 into the firebrick with the initiator supported therein. A wire retaining screen 11 (or other perforated support) is secured to the gas generator housing 22 in a conventional manner at the exit end of the housing. Support bed 34 employs a 21-hole chemically loaded, porous firebrick cylinder as a distributed bed loading. Cavities 38 are drilled perpendicular to the surface of porous firebrick support bed 34. There are 7 rows of 3 cavities each. The cavities in every row are displaced 120 degrees apart. Each cavity in every row is displaced 60 degrees from the corresponding cavity in the next row; e.g., alternate and intermediate rows are displaced 60 degrees from each other.

The cavities in every row meet at the longitudinal axis 40 running through the cylindrical porous firebrick structure.

Essentially, an odd number of total rows of three cavities each, with the cavities in a given row being placed 120 degrees apart and alternate and intermediate rows being displaced 60 degrees from each other, may be employed, provided at least a total of three rows are used.

In a broader sense, any longitudinally and latitudinally symmetrical arrangement of a plurality of cavities may be employed.

Monopropellants which have been satisfactorily used with the gas generating bed of this invention are hydrazine and hydrazine-type fuels (e.g., 1,1-dimethylhydrazine and monomethylhydrazine). Mixtures thereof may be particularly desirable in certain instances. Note, however, that almost any exothermally decomposing monopropellant may be used.

The porosity of the firebrick is sufficient to allow passage of the liquid monopropellant through the support material in order to contact the initiator and to allow the passage of the decomposition gases from the support bed. The firebrick is also rigid enough to provide the support necessary. A porosity of from about 65 percent to about 85 percent has been satisfactorily employed.

Initiators (oxidizing agents) which have been satisfactorily used are potassium permanganate, phosphorous pentachloride, potassium dichromate, iodic acid, iodic anhydride and calcium permanganate. Other inorganic oxidizing agents and mixtures thereof may also be used as initiators, provided the oxidizing agent used reacts vigorously with the monopropellant. Note, however, that not every oxidizing agent will work with every exothermally decomposing monopropellant. In particular, potassium permanganate will not work with 1,1-dimethylhydrazine. With this exception, any of the five specific oxidizing agents given above will generally work with any exothermally decomposing monopropellant. Accordingly, the term suitable oxidizing agent is defined herein to mean any agent that will react with the particular monopropellant chosen.

The best known refractory adhesive 17 for this invention is Sauereisen Insa-lute Adhesive Cement No. 1 (paste), made by the Sauereisen Cements Company of Pittsburgh, Pennsylvania. Another satisfactory refractory adhesive is the Sauereisen Insa-lute Adhesive Cement No. P-1 (powder), made by the same manufacturer. Other equivalent refractory adhesives may be employed.

OPERATION OF THE DEVICE

With the initiator placed in or on the support or bed, the monopropellant is admitted to the bed to react rapidly and vigorously with the initiator. The initiator is consumed in the reaction, and the initial reaction also decomposes the monopropellant with resultant gas formation. The reaction between the monopropellant and initiator generates sufficient heat to bring the support up to a sufficient temperature to maintain the decomposition, with gas generation, of the monopropellant throughout the required operational time of the gas generator, even after the initiator has been consumed.

In order to achieve this self-sustaining reaction, an exothermally decomposing monopropellant must be used. Also, the initiator must be loaded in the inert porous support material in such a manner that when the exothermally decomposing monopropellant is injected into the inert porous support material, not only is gas generation started, but also sufficient heat is generated by the reaction to heat the inert porous support material to a temperature sufficient to maintain the exothermal decomposition after the initiator has been consumed. Additionally, the heat radiated from the initial reaction must be distributed generally throughout the inert porous support material in a uniform fashion to insure that a sufficient temperature throughout the bed is reached. This temperature is necessary to maintain the exothermal decomposition.

On-off operational capability is possible since the support is maintained at a sufficient temperature for a few minutes during the off-phase so that when the propellant is readmitted, spontaneous decomposition recommences.

Porous firebrick is especially satisfactory for holding sufficient heat to allow "pulsing" or on-off operation.

This invention is not to be limited to the embodiments described herein, which are given merely for purposes of illustration. Various other modifications and variations of this invention will become readily apparent to those skilled in the art in the light of the above teachings, which variations and modifications are within the spirit and scope of this invention.

We claim:

1. A gas generating bed adapted to be mounted in a gas generator housing, said bed comprising an inert porous support material of firebrick with a porosity of from about 65 percent to about 85 percent, a sleeve surrounding said inert porous support material, and a compacted solid inorganic oxidizing agent sandwiched between two layers of said porous firebrick.

2. A gas generating bed adapted to be mounted in a gas generator housing, said bed comprising an inert porous support material of firebrick with a porosity of from about 65 percent to about 85 percent, a sleeve surrounding said inert porous support material, and solid inorganic oxidizing agent suspended between portions of said inert porous support material by being uniformly dispersed in the pores of said inert porous support material.

3. A gas generating bed adapted to be mounted in a gas generator housing, said bed comprising an inert porous support material of firebrick and having a cavity formed therein, a sleeve surrounding said inert porous support material, and solid inorganic oxidizing agent in said cavity of said inert porous support material.

4. The gas generating bed of claim 3 wherein said inorganic oxidizing agent is a compacted solid and said inert porous support material is porous firebrick with a porosity of from about 65 percent to about 85 percent.

5. The gas generating bed of claim 4 wherein said inert porous support material surrounds at least two surfaces of said inorganic oxidizing agent.

6. The gas generating bed of claim 5 wherein said inorganic oxidizing agent is completely surrounded by said inert porous support material.

7. The gas generating bed of claim 3 wherein said inert porous support material has a plurality of cavities formed therein and said cavities are both longitudinally and latitudinally symmetrical with respect to said porous support material.

8. The gas generating bed of claim 7 wherein said bed is cylindrical and said cavities are arranged in an even number of alternate rows of three cavities and an odd number of at least one intermediate row of three cavities, each of said cavities being perpendicular to a plane passing through the longitudinal axis of said bed, said holes in each of said rows of three cavities being spaced equidistant around the surface of said bed and meeting at said longitudinal axis of said bed, said alternate and said intermediate rows of cavities being displaced 60 degrees from each other.

9. The structure of claim 8 wherein said even number is four and said odd number is three.

References Cited

UNITED STATES PATENTS

| | | | |
|---|---|---|---|
| 2,698,514 | 1/1955 | Hull et al. | 60—258 |
| 3,101,589 | 8/1963 | Hamrick et al. | 60—39.82 |
| 3,298,182 | 1/1967 | Webb | 60—218 |

SAMUEL FEINBERG, Primary Examiner

U.S. Cl. X.R.

60—39.46